(12) United States Patent
Moisevenko et al.

(10) Patent No.: US 7,112,096 B2
(45) Date of Patent: Sep. 26, 2006

(54) HOT CONTACT ADAPTER FOR PORTABLE COMPUTING DEVICE

(75) Inventors: Stanislav Moisevenko, Mountain View, CA (US); Vadim Pichahchi, Mountain View, CA (US); Abdur Rahman, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/791,912

(22) Filed: Mar. 3, 2004

(65) Prior Publication Data

US 2005/0197016 A1   Sep. 8, 2005

(51) Int. Cl.
*H01R 27/02* (2006.01)
(52) U.S. Cl. ........................ 439/638; 439/929
(58) Field of Classification Search ............... 439/372, 439/638, 929, 953; 320/115
See application file for complete search history.

(56) References Cited

U.S. PATENT DOCUMENTS

| | | | | |
|---|---|---|---|---|
| 3,644,873 A | * | 2/1972 | Dalton et al. | 439/299 |
| 4,248,494 A | * | 2/1981 | McDonald et al. | 439/638 |
| 5,363,031 A | * | 11/1994 | Miller et al. | 320/115 |
| 6,476,795 B1 | * | 11/2002 | Derocher et al. | 345/163 |
| 6,905,370 B1 | * | 6/2005 | Blackwell | 439/638 |
| 6,921,294 B1 | * | 7/2005 | Devine et al. | 439/638 |

* cited by examiner

*Primary Examiner*—Khiem Nguyen
(74) *Attorney, Agent, or Firm*—Sheppard Mullin Richter & Hampton LLP

(57) ABSTRACT

A hot contact adapter for use with portable computing devices, such as laptop, notebook and tablet computers, PDA's and gaming devices, is disclosed. The adapter has a plug which fits in the power input port of the device and a body have a distal surface with exposed electrodes formed thereon. The device, with the adapter mounted thereon, may then be used with a charging cradle having electrodes which contact the adapter electrodes when the device is placed in the cradle. The cradle is connected to a source of power, such that power is supplied to the device in the cradle via the adapter.

11 Claims, 4 Drawing Sheets

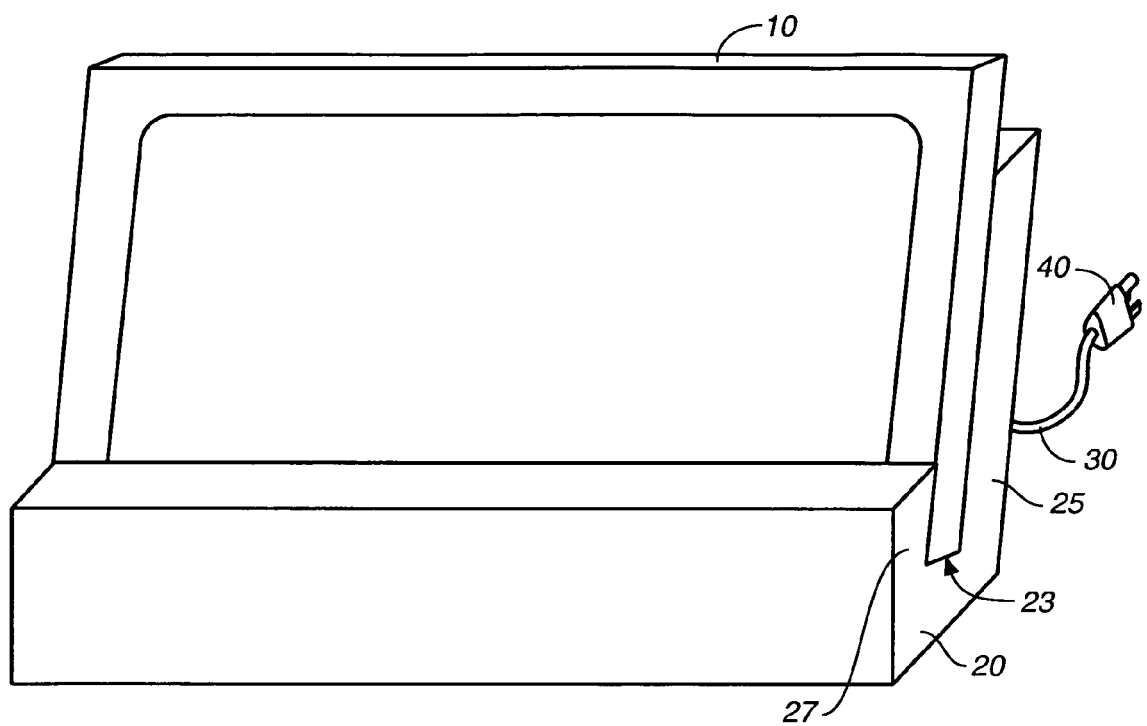
FIG._1
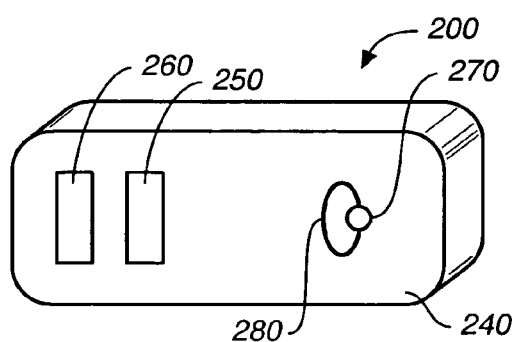
FIG._2A
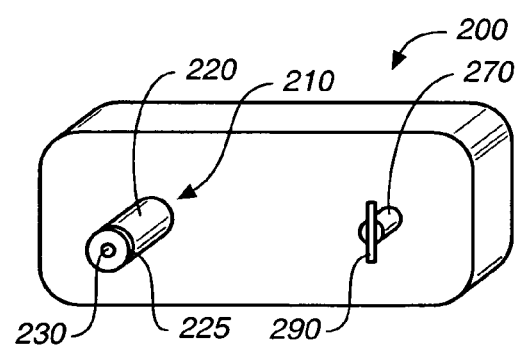
FIG._2B

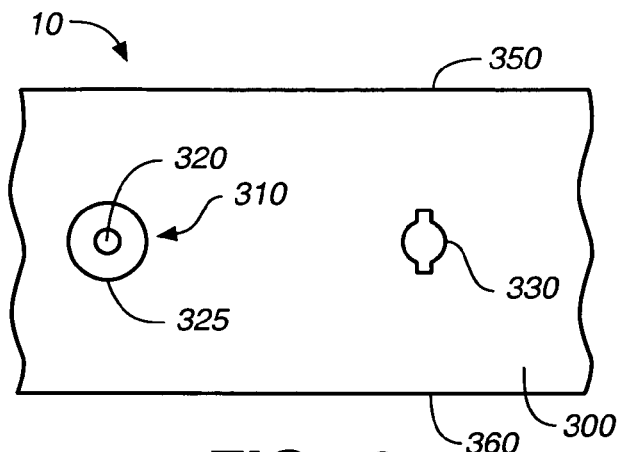
FIG._3
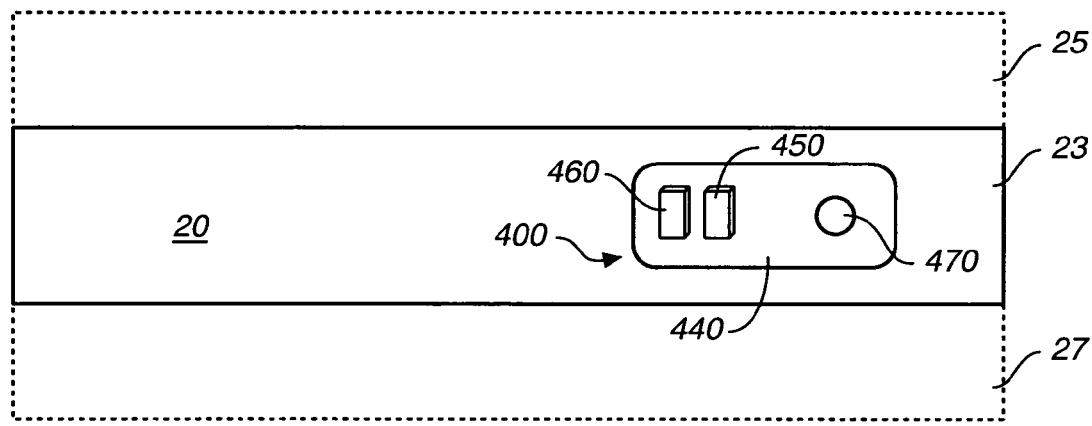
FIG._4
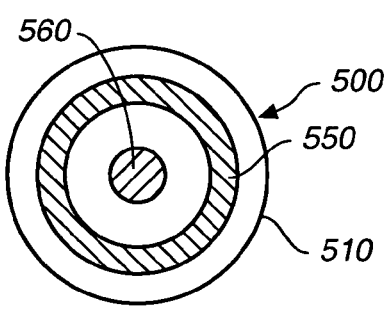
FIG._5A
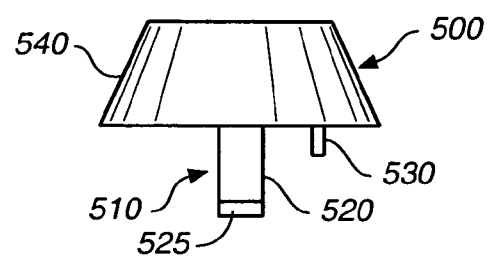
FIG._5B

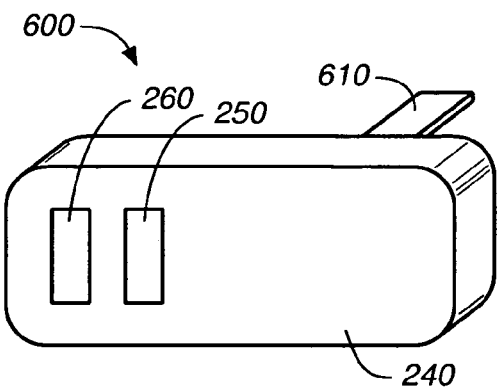
FIG._6
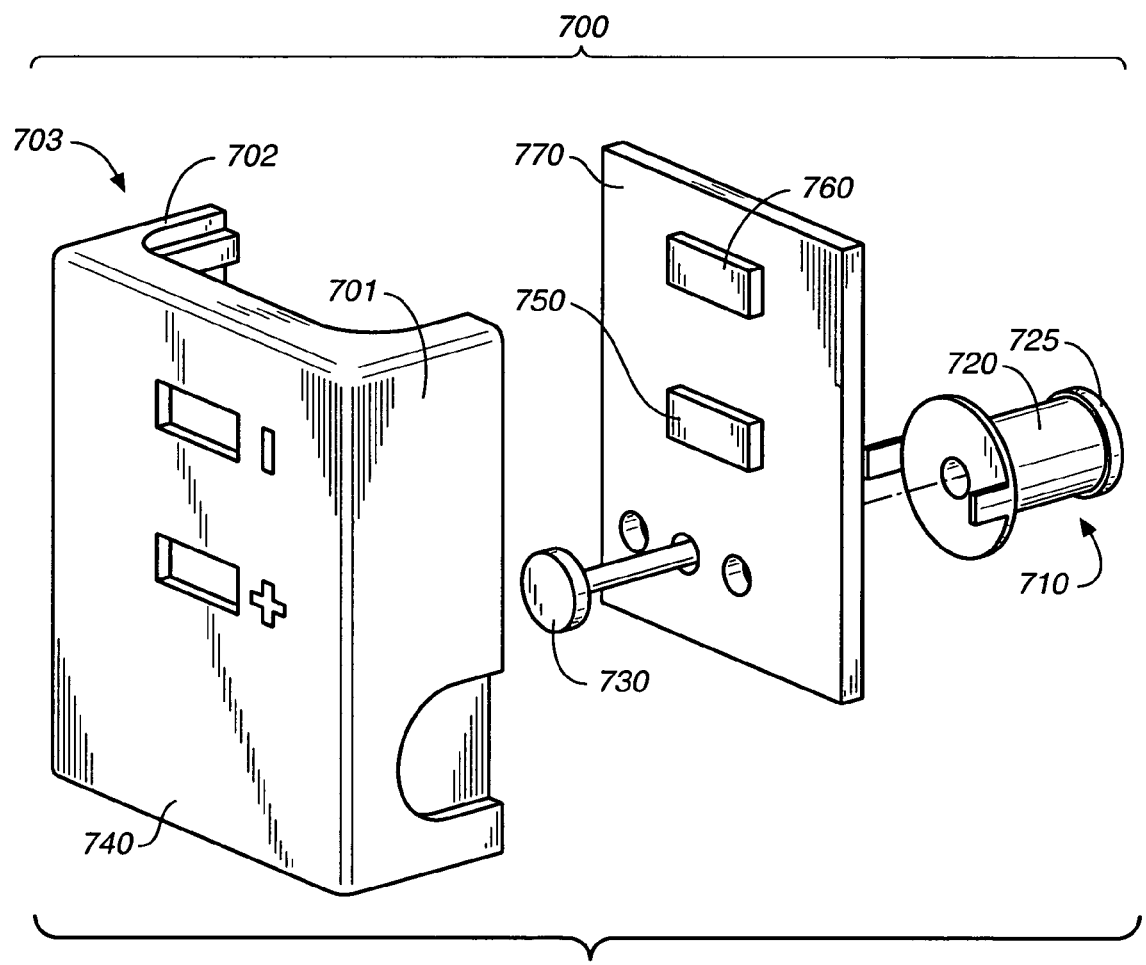
FIG._7

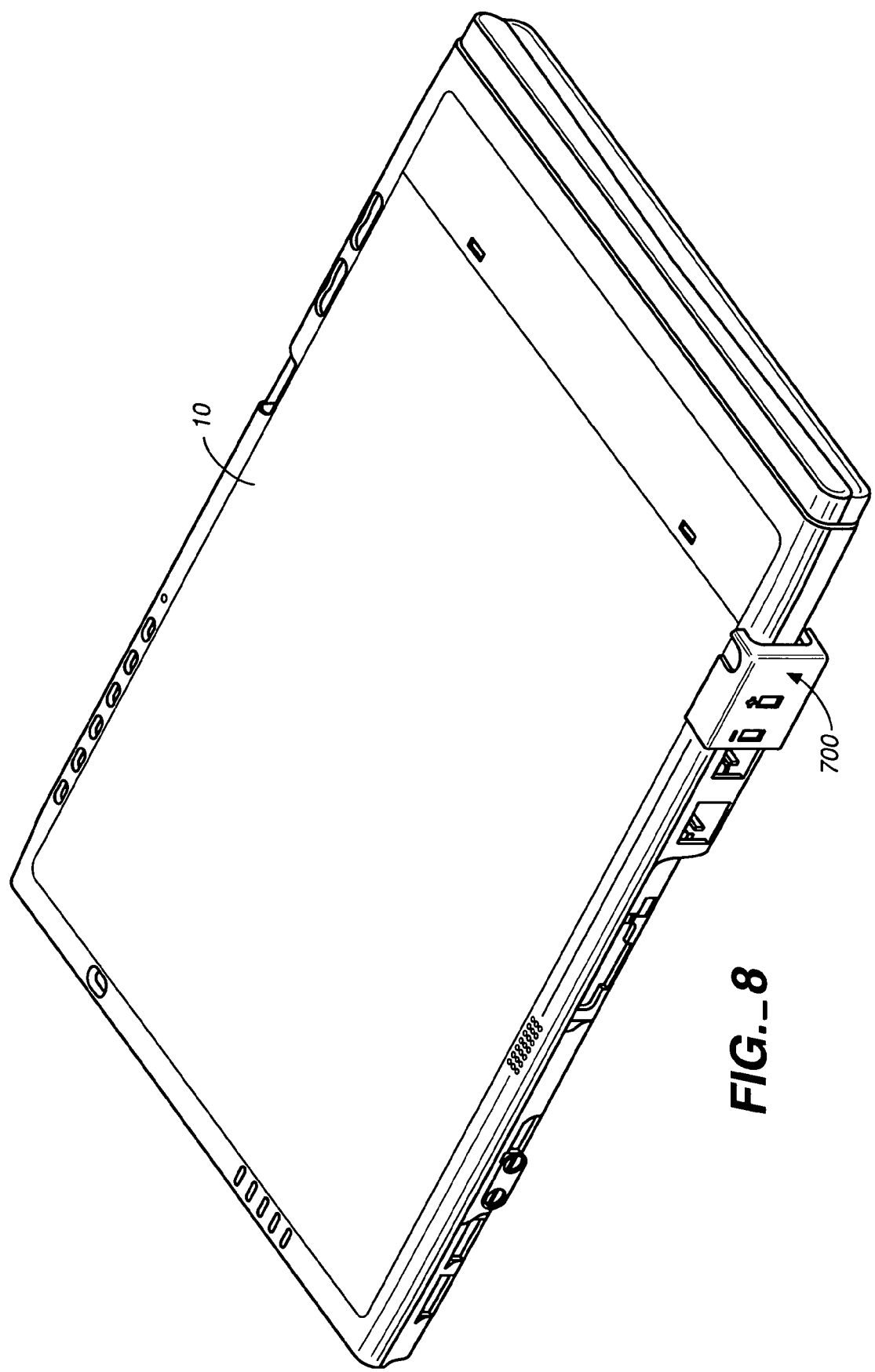
FIG._8

HOT CONTACT ADAPTER FOR PORTABLE COMPUTING DEVICE

FIELD OF THE INVENTION

The present invention relates to a method and apparatus for supplying power to portable computing devices, and is particularly related to an adapter which allows a portable computing device to be easily connected and disconnected from a source of power in a charging cradle.

BACKGROUND OF THE INVENTION

Many types of portable computing devices, such as laptop, notebook or tablet computers, personal digital assistants (PDA's), handheld game devices and the like, use rechargeable batteries which require periodic connection to a source of power to replenish their energy stores. Typically, such devices include a power input port or jack which accepts a connector attached to a power source, such as the DC output of an external voltage converter connected to a an AC power outlet, or an automotive electrical system. A few portable computing devices are designed to directly accept AC line power, but generally this is not preferred insofar as it requires that a voltage converter be incorporated within the device, thereby increasing its size and weight. For the most part, use of an internal AC converter is avoided because small size and low weight are primary design goals to enhance device portability. In either case, the power input port is typically configured so that is can be used both as a source of power for operating the device and for recharging the device battery. While for convenience the present specification refers to a device battery, the present discussion and invention are equally applicable to devices with multiple batteries.

Generally, the external power connection is made via a male/female plug and receptacle combination. Specifically, in the typical arrangement a male element from the power source is inserted into a recess in the computing device with appropriate contacts to enable electrical connection. When DC power is being supplied to the portable computing device from an external power supply, the connector must be configured to ensure the correct voltage polarity.

Some types of known portable computing devices, such as PDA's and tablet computers are adapted to reside in a "cradle" which provides various types of connections to the device. Laptop, notebook and tablet computers may be adapted to be received in a "docking station" which provides various types of connections to the computer. By way of examples, a cradle used with a PDA may be connected to a personal computer to enable data synchronization, or a docking station may provide a plurality of "ports" for connecting various types of devices, such as printers, network and telephone lines, speakers, pointing devices, etc. to a laptop computer. Typically, the cradle or docking station has a specialized or proprietary plug-in type connector which supplies operating power to the device as well as providing the additional functionality, as described.

Known prior art cradles and docking stations use high density pin contacts to provide extensive functionality, but these high density connectors have limited life, especially when subjected to heavy use. Thus, while providing added functionality, prior art cradles and docking stations require the user to pay considerable attention to the operations of aligning and inserting the portable computing device into the connector to make connection. Often docking stations have a locking mechanism which requires the user to perform the additional step of locking the device for docking, and which requires the user to activate a release mechanism to disengage the device.

Tablet computers have found particular utility in field settings where portability, ease of use and computing power are important, but where use of a notebook or laptop may not be practical. Exemplary settings where tablets computer are particularly useful include law enforcement, delivery services and health care. Often, in such settings, a large number of tablet computers are subject to heavy use requiring frequent recharging. In such settings, ease of use is particularly important. In addition to the portability they afford, tablet computers are typically adapted for use with docking stations, enabling them to have the full functionality of a personal computer. However, in many settings the need for frequent recharging is greater than the need for full functionality and so recharging through a docking station is unnecessary and inconvenient.

SUMMARY OF THE INVENTION

Accordingly, it is an object of the present invention to provide a method and apparatus which provides for easy and reliable means for supplying external power to a portable computing device for charging batteries in the device or for device operation.

Another object of the present invention is to provide an adapter for use with existing types of input power ports found on portable computing devices, which enables the devices to work with easy-to-use charging cradles.

These and other objects of the invention which will be apparent to those skilled in the art after reading this patent specification are achieved by the present invention which, in one aspect, comprises a hot contact adapter for a portable computing device, having a plug for inserting into a power port in the portable computing device and providing electrical contact therewith, a body extending from the plug having a surface distal from the plug having a pair of generally flat electrodes electrically coupled to power input electrodes in the power port when the plug is inserted into the power port. The adapter may have an alignment structure for orienting the adapter or limiting its movement when it is inserted into the power port. The adapter may have a releasable locking structure for securely holding the adapter in position. In one embodiment, the adapter plug is generally cylindrical, the distal surface is generally flat and the electrodes are substantially the same rectangular shape and are co-planar with said distal surface. The body of the adapter may be shaped to rest in a recess in a charging cradle used for holding the portable computing device.

In another aspect, the present invention comprises a system for providing easy recharging of a portable computing device, having a charging cradle for holding the portable computing device, the charging cradle having a connector for coupling to an external source of electrical power, and a pair of electrodes for supplying power to the portable computing device when the portable computing device is positioned in the charging cradle, and a removable adapter for connecting to a power input port on the portable computing device, the removable adapter having a pair of generally flat electrodes which contact the electrodes on the charging cradle such that electrical power is supplied to the portable computing device by said charging cradle via said adapter. In one embodiment, a portion of the adapter projects from a surface of the computing device and the projecting portion rests in a corresponding recess in the cradle. One pair of the electrodes may be spring biased.

In another aspect the present invention comprises a method of supplying power to a portable computing device, involving inserting a hot contact adapter into a power input port of the portable computing device, the adapter having an alignment mechanism so that it is correctly oriented, the adapter having a pair of electrodes on an external surface thereof, the pair of electrodes being electrically coupled to corresponding electrodes in the power input port, placing the portable computing device, with the adapter mounted thereon, into a charging cradle having a connector for receiving electrical power from an external source and further having a pair of electrodes which contact the electrodes on the adapter, and connecting the connector on the cradle to a source of external power, thereby delivering power to the power input port of said portable computing device.

BRIEF DESCRIPTION OF THE DRAWINGS

The foregoing aspects and the attendant advantages of this invention will become more readily apparent by reference to the following detailed description when taken in conjunction with the accompanying drawings wherein:

FIG. 1 is a perspective view of a tablet computer resting in a charging cradle according to the present invention.

FIGS. 2A and 2B are front and rear perspective views, respectively, of one embodiment of a hot contact adapter of the present invention.

FIG. 3 is a partial view of the rear of a table computer, showing a power inlet port and an aperture for receiving a locking structure.

FIG. 4 is a partial top view of a charging cradle in accordance with the present invention.

FIGS. 5A and 5B are top and side views, respectively, of another embodiment of the adapter the present invention.

FIG. 6 is a perspective view of another embodiment of the adapter of present invention.

FIG. 7 is an exploded view of another embodiment of the adapter of the present invention.

FIG. 8 is a perspective view of an adapter mounted on a tablet computer in accordance with the present invention.

DETAILED DESCRIPTION OF THE INVENTION

For clarity the following detailed description is written in the context of specific embodiments of the present invention, and is not intended to be limiting. For example, the following discussion is directed to use of the invention in connection with a tablet computer. However, it will be apparent to those skilled in the art that the invention may also be applied to a variety of different types of portable computer devices which require frequent recharging, including laptop and notebook computers, PDA's, and handheld gaming devices.

Referring to FIG. 1, a tablet computer 10 is shown resting in a charging cradle 20. As depicted in FIG. 1, after placement in cradle 20, computer 10 is maintained in position by the force of gravity. The configuration of cradle 20 provides a highly stable base, which minimizes the risk of tipping or accidental movement of computer 10. Computer 10 rests primarily on a bottom surface 23 which extends between a back wall 25 and a front wall 27 of cradle 20. Some support for computer 10 is provided by back wall 25 which is, preferably, angled in the manner shown. As can be seen, the combination of back wall 25, front wall 27 and bottom surface 23 creates a slot, such that it is very easy for a user to insert and remove computer 10 into and out of cradle 20, especially if there is no need to carefully align the computer with a complex connector in the slot. While FIG. 1 shows an embodiment wherein the slot is open at the ends thereof, the ends of the slot may also be closed.

Cradle 20 is connected to a source of electrical power via power line 30 which terminates with power plug 40. Power plug 40 may conveniently be a standard AC plug, as depicted, or any other type of plug suitable for connecting to a source of electrical power. Other types of power plugs include those used in automotive and airline environments. Power line 30 may be permanently attached to cradle 20, or may be removably connectable thereto. Cradle 20 preferably includes a voltage converter (not shown) for transforming the input power to a voltage suitable for use by the tablet computer. For example, a voltage converter for transforming 120V AC line power to 12V DC which can be used directly by computer 10.

Referring now to FIGS. 2A, 2B and 3, there is shown front and rear views of a hot contact adapter 200 according to one embodiment of the present invention (FIGS. 2A and 2B, respectively), and a portion of an end wall 300 on computer 10 which receives hot contact adapter 200 (FIG. 3). Computer 10 has an input power port 310 positioned on end wall 300. As previously described, input power port 310 is typically designed to receive DC power from a voltage converter connected to an external power source, which is used to recharge one or more internal batteries housed in computer 10 and for operating the computer. As previously described, some portable computing devices, such are larger notebook computers, are adapted to be connected directly to an AC power source, without the need for external voltage connection, and the presence or absence of an external voltage converter is not important to the present invention except to the extent it is necessary to avoid exposing users to possible contact with a high voltage source.

Input power port 310 shown in FIG. 3 comprises a generally concentric cylindrical recesses for receiving a male plug, such as plug 210 shown in FIG. 2B. The peripheral wall 320 of inner cylindrical recess, comprises one electrode, and the peripheral wall 325 of the outer recess comprises the second electrode. Electrodes 320, 325 connect to corresponding electrodes on plug 210. Thus, outer annular electrode 220 contacts the outer electrode 325 and inner pin electrode 230 contacts an electrode contacts electrode 320. Insulating sleeve 225 prevents inadvertent contact between electrodes of the wrong polarity. This structure, which is commonly used in portable computing devices, ensures that DC voltage of the correct polarity is connected to computer 10. Other power input port structures are also commonly used with portable computing devices and may be used in connection with the present invention.

Typically, a portable computing device, such as tablet computer 10, comes with a power supply structure that can be removably connected to a power source and to the computing device. Typically, such power supply structures are designed to be small, lightweight and, thereby, highly portable. In addition, portable computing devices are often structured to be connected to a docking station or a cradle. Docking stations and cradles of the prior art typically are not highly portable and, thus, are not intended to replace a portable power source. Rather, these devices have been used primarily for the purpose of enhancing the functionality of the associated portable computing devices. Thus, prior art docking stations and cradles typically use one or more complex connectors for linking the to the portable computing device. Use of these complex connectors requires substantial care to avoid damaging small, fragile connecting pins or surfaces.

According to the present invention, plug 210 of the hot contact adapter 200 mates with and is inserted into power input port 310. When fully inserted, adapter 200 has a surface 240 which is on the opposite side of the adapter from plug 210 and, therefore, is distal with respect to surface 300 on the portable computing device. Located on distal surface 240 is a pair of electrodes, 250 and 260. In the depicted embodiment, electrodes 250 and 260 are substantially identical, generally flat, rectangular metallic surfaces which are substantially co-planar with distal surface 240. Electrode pair 250, 260 are electrically connected to the electrodes positioned on plug 210, such that when adapter 200 is in position on the computer 10, electrical power can be delivered to the computer via electrodes 250 and 260.

In the embodiment depicted in FIGS. 2A and 2B, adapter 200 has a locking mechanism for securely holding the adapter on computer 10. Locking mechanism comprises a rotatable shaft 270 having a handle 280 on one end thereof and a pin 290 on the other end. Shaft 270 extends substantially beyond the plug-side surface of the body of adapter 200, and is designed to fit within keyhole aperture 330 on wall 300 when plug 210 is inserted in input power port 310. By rotating shaft 270 using handle 280, pin 290 may be moved into an out of alignment with a corresponding segment of keyhole aperture 330, thereby providing the locking mechanism. Those skilled in the art will appreciate that many simple locking structures are easily adaptable for use with the adapter of the present invention, and the particular structure shown in FIGS. 2A and 2B is merely one embodiment of this aspect of the invention. Further, while the locking structure shown is useful for securely fastening adapter 200 to computer 10, other types of structures may be used to retain the adapter on the computing device. For example, when positioned within port 310, plug 210 may itself provide a sufficient hold to maintain the adapter in position. Typically, plug 210 is designed to apply pressure to the center electrode 310 to ensure good electrical contact, and this pressure may provide sufficient grip to hold the adapter in place. Alternative mating plug and port designs may be used, such that a locking structure is incorporated directly therein.

The plug and port combination shown in FIGS. 2B and 3 are rotationally symmetrical. It is preferred to incorporate an alignment structure to position adapter 200 and prevent it from rotating. Of course, the locking structure depicted also serves as such an alignment structure. However, if no locking structure is used, it is, nonetheless, preferred to include an alignment structure. Alternative alignment structures are depicted in FIGS. 5B (discussed below) and 6.

Adapter 600 of FIG. 6 is otherwise the same as adapter 200 of FIGS. 2A and 2B, except that it does not have a locking mechanism and instead, has a pair of alignment tabs 610 (one shown) extend from adapter 600 at positions corresponding to the upper and lower edges (350, 360) of wall 300. Thus, when adapter 600 is in place tabs 610 prevent rotation and keep the adapter in position. Tabs 610 may be flexible and designed to grip computer 10, thereby helping to securely hold adapter 600 in place. Tabs 610 may also have detents which engage corresponding structure on computer 10 to further enhance their ability to grip the computer.

Turning now to FIG. 4, a top view looking into the slot of cradle 20 is shown. A recess 400 is formed in bottom wall 23 to accommodate and mate with adapter 200. Recess 400 has a depth which is approximately equal to the thickness of the adapter, such that when computer 10 is resting in the slot, the exposed portion of rear surface 300 rest on bottom wall 23 and adapter electrode pair 250, 260 rests on a corresponding pair of electrodes 450, 460 in recess 400. One or the other of the electrode pairs may be spring-loaded. In FIG. 4, electrodes 450, 460 are shown raised above the bottom surface 440 of recess 400 to depict that they are spring loaded. It is preferred that the electrodes in the cradle recess be spring loaded, rather than the electrodes on adapter 200, because they are better protected from inadvertent contact and damage. Spring loading the electrodes results in better and more reliable contact between opposing electrodes. If needed, an appropriately sized depression or aperture 470 may be formed in bottom wall 440 of recess 400 to accommodate handle 280 on the locking structure. Note that there is only one proper way for adapter 200 to fit within slot 400, and so there is no risk that voltage of the wrong polarity will be delivered to the adapter.

Electrodes 450, 460 in recess 400 are connected to a source of power of the appropriate voltage and polarity. As described above, in connection with FIG. 1, cradle 10 preferably has a voltage converter housed therein, and is connectable to an external voltage source, such as AC line power. Thus, when computer 10 with adapter 200 mounted thereon is placed in the slot of cradle 20, electrical power is delivered to the power port 310 via the adapter. As also noted above, some portable computer devices accept AC line power directly. The present invention may also be used with such devices, however, the overall system should be configured so as to prevent inadvertent user contact with high-voltage "hot" electrodes. This is not a concern when the voltage delivered to the electrodes is relatively low, e.g., 12 V DC.

It is noted that cradle 20 is especially adapted as a charging cradle in accordance with the present invention. Specifically, cradle 20 is specifically designed to enable a user to easily perform the function of recharging the battery of a portable computing device, and includes a structure for mating with the adapter of the present invention. By simply placing the computing device in the cradle slot, without the need for inserting or mating with a complex connector, the computer may be recharged. Preferably, cradle 20 does not have any other connectors which would complicate the process of inserting and removing the computer. As discussed above, in many institutional environments portable computing devices, such as tablet computers, receive heavy use, creating a need for repeated recharging. The present invention addresses that need in a way which is easy and very user friendly. Moreover, where multiple devices are in use, a few cradles may be adequate to recharge a much larger number of devices.

An alternative embodiment of an adapter of the present invention is depicted in FIGS. 5A and 5B. FIG. 5A is a top view and FIG. 5B is a side view of an adapter 500. In this embodiment, adapter 500 has an overall circular shape, with a tapered sidewall 540. Plug 510 is the same as plug 210 and mates with power input port 310 on wall 300 of computer 10. Specifically, plug 510 has two electrodes (only one of which, 520, is shown) which contact corresponding electrodes in the power input port. The embodiment shown in FIGS. 5A and 5B does not include a locking structure but, instead FIG. 5B shows an optional alignment pin 530 projecting from the rear wall of adapter 500. When adapter 500 is mounted on computer 10, alignment pin 530 mates with an aperture in wall 300 (not shown), preventing rotation of the adapter.

The distal surface of adapter 500 has an electrode pair comprising an outer annular electrode 550 and an inner circular electrode 560. As will be appreciated by the foregoing discussion, adapter 500 mates with and rests within a generally circular, tapered recess (not shown) in cradle 20, the recess having corresponding electrodes which contact electrodes 550, 560. Tapering of the wall of adapter 500 facilitates easy positioning and placement of the adapter/computer combination in the cradle. (The sidewall of adapter 200 may be also tapered, rather than vertical as shown in FIGS. 2A and 2B.)

FIG. 7 shows an exploded view of another embodiment of an adapter 700 of the present invention. Adapter 700 comprises an exterior plastic shell 703 having tabs, 701, 702 which extend from the body of the adapter to engage the computer. As shown, the intersections between the tabs and the adapter body have a curvature which matches the curvature of the corresponding edges of the computer so that the adapter fits snugly on the computer. Also shown in the exploded view of FIG. 7 is a printed circuit board 770 which contains traces (not shown) electrically connecting inner electrode 730 and outer electrode 720 of plug 710 to electrode pair 750 and 760. As shown, electrode pair 750, 760 are formed on the surface of printed circuit board 770 and fit within apertures formed in plastic shell 703. Thus, when assembled, electrode pair 750, 760 is substantially flush and coplanar with distal surface 740 of the adapter. FIG. 8 shows adapter 700 mounted on tablet computer 10.

In accordance with a method of practicing the present invention, a hot contact adapter is mounted on a portable computing device, the hot contact adapter having external electrodes thereon, the portable computing device is placed in a charging cradle such that the external electrodes of the adapter come in contact with corresponding electrodes positioned on the cradle, and supplying power to the cradle electrodes, such that power is delivered to the portable computing device via said adapter.

The embodiments described above are illustrative of the present invention and are not intended to limit the scope of the invention to the particular embodiments described. Accordingly, while several embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

What is claimed is:

1. A hot contact adapter for charging a portable computer, comprising: a plug for inserting into a power port in the portable computing device and providing electrical contact therewith, and a body extending from said plug, said body having a surface distal from said plug, said distal surface comprising a pair of generally flat electrodes electrically coupled to power input electrodes in said power port when said plug is inserted into the power port.

2. The adapter of claim 1 further comprising an alignment structure for orienting the adapter when said plug is inserted into the power port.

3. The adapter of claim 1 wherein said plug is generally cylindrical.

4. The adapter of claim 1 wherein said distal surface is generally flat and said pair of generally flat electrodes is substantially co-planar with said distal surface.

5. The adapter of claim 1 wherein each of said pair of generally flat electrodes is substantially the same shape.

6. The adapter of claim 5 wherein each of said generally flat electrodes is substantially rectangular.

7. The adapter of claim 1 wherein said adapter is shaped to rest in a recess in a charging cradle.

8. The adapter of claim 2 wherein said alignment structure comprises at least one tabs for contacting a surface of the portable computing device.

9. A hot contact adapter for use with a computing device which mates with a charging cradle, said computing device having a recessed, generally cylindrical DC input power port, said adapter comprising: a plug which mates with and makes electrical contact with said input power port, a body connected to said plug, said body having a distal surface in relation to said portable computing device, said distal surface having a pair of generally flat electrodes positioned thereon for mating with a pair of corresponding electrodes positioned on said charging cradle, and an alignment structure.

10. The adapter of claim 9 wherein said body projects from a surface of the portable computing device and said adapter has a shape which nests within a recess in the charging cradle.

11. The adapter of claim 9 wherein said alignment structure comprises at least one tab projecting from said body for contacting a wall of the portable computing device.

* * * * *

UNITED STATES PATENT AND TRADEMARK OFFICE
CERTIFICATE OF CORRECTION

PATENT NO. : 7,112,096 B2 Page 1 of 1
APPLICATION NO. : 10/791912
DATED : September 26, 2006
INVENTOR(S) : Moiseyenko et al.

It is certified that error appears in the above-identified patent and that said Letters Patent is hereby corrected as shown below:

On the Title page, at Sections (12) and (75), please correct the first inventor's name from "Moisevenko" to -- Moiseyenko --.

Signed and Sealed this

Thirteenth Day of November, 2007

JON W. DUDAS
*Director of the United States Patent and Trademark Office*